US012347373B2

(12) United States Patent
Wang et al.

(10) Patent No.: US 12,347,373 B2
(45) Date of Patent: Jul. 1, 2025

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Miao Wang, Beijing (CN); Yonglin Guo, Beijing (CN); Dan Cao, Beijing (CN); Cong Liu, Beijing (CN); Binyan Wang, Beijing (CN); Wenhui Gao, Beijing (CN); Ziyang Yu, Beijing (CN); Zhiliang Jiang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/290,794

(22) PCT Filed: Mar. 28, 2023

(86) PCT No.: PCT/CN2023/084434

§ 371 (c)(1),
(2) Date: Jan. 21, 2024

(87) PCT Pub. No.: WO2024/197578

PCT Pub. Date: Oct. 3, 2024

(65) Prior Publication Data

US 2025/0095570 A1 Mar. 20, 2025

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01); *G09G 2310/08* (2013.01); *G09G 2320/0247* (2013.01)

(58) Field of Classification Search
CPC ......... G09G 3/3233; G09G 2300/0842; G09G 2310/061; G09G 2310/08; G09G 2320/0247
See application file for complete search history.

(56) References Cited

U.S. PATENT DOCUMENTS

2019/0073955 A1* 3/2019 Zou ..................... G09G 3/3258
2020/0394961 A1* 12/2020 Kim ..................... G09G 3/3266
(Continued)

FOREIGN PATENT DOCUMENTS

CN 105336292 A 2/2016
CN 107358920 A 11/2017
(Continued)

*Primary Examiner* — Amit Chatly
(74) *Attorney, Agent, or Firm* — IPro, PLLC

(57) ABSTRACT

Disclosed are a display panel and a display device. The pixel circuit in the display panel includes a control circuit, a drive circuit, and a regulating circuit. The control circuit controls the potential of the coupled control node based on the gate drive signal provided by the gate line and the data signal provided by the data line. The drive circuit drives the light-emitting element to emit light based on the potential of the control node and the drive power signal provided by the drive power line. The regulating circuit adjusts the potential of the control node through the coupling effect based on the drive power signal and the initial power signal provided by the initial power line.

18 Claims, 12 Drawing Sheets

(56) References Cited

U.S. PATENT DOCUMENTS

| | | | | |
|---|---|---|---|---|
| 2021/0383752 | A1* | 12/2021 | Yang | G09G 3/3233 |
| 2021/0407383 | A1* | 12/2021 | Lai | G09G 3/3233 |
| 2022/0130322 | A1 | 4/2022 | Yuan et al. | |
| 2022/0208932 | A1* | 6/2022 | Yun | H10K 59/1216 |
| 2023/0360600 | A1* | 11/2023 | Wang | G09G 3/3233 |
| 2024/0078974 | A1* | 3/2024 | Kim | G09G 3/3233 |

FOREIGN PATENT DOCUMENTS

| | | | |
|---|---|---|---|
| CN | 110189708 | A | 8/2019 |
| CN | 112216244 | A | 1/2021 |
| CN | 112331134 | A | 2/2021 |
| CN | 114582287 | A | 6/2022 |
| CN | 115696988 | A | 2/2023 |
| CN | 117678007 | A | 3/2024 |
| JP | 2016009156 | A | 1/2016 |

* cited by examiner

DISPLAY PANEL AND DISPLAY DEVICE

The present disclosure is a U.S. national stage of international application No. PCT/CN2023/084434, filed on Mar. 28, 2023, the disclosure of which is herein incorporated by reference in its entirety.

TECHNICAL FIELD

The present disclosure relates to the field of display technologies, in particular, relates to a display panel and a display device.

BACKGROUND

Organic light emitting diode (OLED) display panels are commonly used in various display devices due to their advantages such as spontaneous emission, rapid response, and wide viewing angles.

SUMMARY

A display panel and a display device are provided. The technical solutions are as follows:

According to some embodiments, a display panel is provided. The display panel includes:

a substrate and a plurality of pixels disposed on the substrate, wherein each pixel includes a pixel circuit and a light-emitting element, wherein the pixel circuit is coupled to the light-emitting element and configured to drive the light-emitting element to emit light, and the pixel circuit includes:

a control circuit coupled respectively to a gate line, a data line, and a control node and configured to control a potential of the control node based on a gate drive signal provided by the gate line and a data signal provided by the data line;

a drive circuit with a control terminal coupled to the control node, an input terminal coupled to a drive power line, and an output terminal coupled to the light-emitting element and configured to transmit a drive signal to the light-emitting element based on the potential of the control node and a drive power signal provided by the drive power line to drive the light-emitting element to emit light; and a regulating circuit coupled respectively to the drive power line, the control node, and an initial power line and configured, through a coupling effect, to regulate the potential of the control node based on an initial power signal provided by the initial power line and the drive power signal.

In some embodiments, the drive circuit includes a drive transistor, and the regulating circuit includes at least one regulation capacitor and a storage capacitor, wherein a gate of the drive transistor is coupled to the control node, a first electrode of the drive transistor is coupled to the drive power line, and a second electrode of the drive transistor is coupled to the light-emitting element;

the at least one regulation capacitor is connected in series between the drive power line and the control node, and the at least one regulation capacitor is also coupled to the initial power line; and the storage capacitor is connected in series between the drive power line and the control node.

In some embodiments, the display panel further includes:

a semiconductor layer, a first metal layer, and a second metal layer sequentially laminated on a side, distal to the substrate, of the substrate, wherein the semiconductor layer is configured to form a first active layer of the at least one regulation capacitor and a second active layer of the drive transistor; the first metal layer and the second metal layer are respectively configured to form a first capacitor plate and a second capacitor plate of the storage capacitor, the first capacitor plate is coupled to the control node, and the second capacitor plate is coupled to the drive power line, wherein both orthographic projections of the first active layer onto the substrate and the second active layer onto the substrate are overlapped with an orthographic projection of the second capacitor plate onto the substrate.

In some embodiments, the regulating circuit includes two regulation capacitors, wherein an overlapping portion between the first active layer and the second capacitor plate is configured to form one regulation capacitor connected in series between the drive power line and the initial power line, and an adjacent portion of the first active layer and the first capacitor plate is configured to form another regulation capacitor connected in series between the initial power line and the control node.

In some embodiments, the first active layer includes a first active portion and a second active portion connected in a first direction, wherein an orthographic projection of the second active portion onto the substrate is overlapped with the orthographic projection of the second capacitor plate onto the substrate, and an orthographic projection of the first active portion onto the substrate is not overlapped with the orthographic projection of the second capacitor plate onto the substrate;

the display panel further includes an insulating layer and a third metal layer that are disposed on a side, distal to the substrate, of the second metal layer, wherein the third metal layer is configured to form a metal portion coupled to the initial power line;

and the metal portion is overlapped with the first active portion through a via hole penetrating the insulating layer, allowing the initial power line to be coupled to the at least one regulation capacitor.

In some embodiments, an area of the orthographic projection of the first active portion onto the substrate is smaller than an area of the orthographic projection of the second active portion onto the substrate.

In some embodiments, the metal portion includes a first metal segment extending along the first direction.

In some embodiments, the metal portion includes a second metal segment extending along a second direction, wherein the second direction intersects with the first direction.

In some embodiments, in the first direction, the first active layer and the second active layer are arranged in a staggered manner, and in the second direction that intersects with the first direction, the first active layer and the second active layer are arranged at intervals;

the plurality of pixels are arranged in an array, wherein the first direction represents a pixel row direction, the second direction represents a pixel column direction, and the first direction is perpendicular to the second direction.

In some embodiments, the control circuit includes:

a data writing module coupled respectively to the gate line, the data line, and the input terminal of the drive circuit and configured to control connection and disconnection between the data line and the input terminal of the drive circuit based on the gate drive signal;

- a light-emitting control module coupled respectively to a light-emitting control line, the drive power line, the input terminal of the drive circuit, the output terminal of the drive circuit, and the light-emitting element and configured to control connection and disconnection between the drive power line and the input terminal of the drive circuit and to control connection and disconnection between the output terminal of the drive circuit and the light-emitting element based on a light-emitting control signal provided by the light-emitting control line;
- a compensation module coupled respectively to a compensation control line, the output terminal of the drive circuit, and the control node and configured to control connection and disconnection between the output terminal of the drive circuit and the control node based on a compensation control signal provided by the compensation control line; and
- a first reset module coupled respectively to a first reset control line, a first reset power line, and the control node and configured to control connection and disconnection between the first reset power line and the control node based on a first reset control signal provided by the first reset control line.

In some embodiments, the compensation control line and the gate line are independent of each other; within a refresh cycle, a period for the compensation control line providing a compensation control signal of an active potential is overlapped with a period for the first reset control line providing a first reset control signal of an active potential, and a number of times that the compensation control line provides the compensation control signal of the active potential and a number of times that the first reset control line provides the first reset control signal of the active potential are both greater than or equal to 3,

- wherein the compensation control signal of the active potential is configured to enable the connection between the output terminal of the drive circuit and the control node, and the first reset control signal of the active potential is configured to enable the connection between the first reset power line and the control node.

In some embodiments, the light-emitting control line includes a first light-emitting control line and a second light-emitting control line, wherein

- the light-emitting control module is coupled to the first light-emitting control line;
- the compensation control line and the first reset control line are both shared with the second light-emitting control line; the compensation control line is shared with an N-th second light-emitting control line, and the first reset control line is shared with an N−7-th second light-emitting control line, where N is an integer greater than 7;
- a period for the N−7-th second light-emitting control line providing a signal of an active potential is overlapped with a period for the N-th second light-emitting control line providing a signal of an active potential, and the period for the N-th second light-emitting control line providing the signal of the active potential is overlapped with the period for the gate line providing a gate drive signal of an active potential, wherein the gate drive signal of the active potential is configured to enable the connection between the data line and the input terminal of the drive circuit.

In some embodiments, the compensation control line is shared with the gate line; the control circuit further includes:

- a second reset module coupled respectively to a second reset control line, a second reset power line, and the input terminal of the drive circuit and configured to control connection and disconnection between the second reset power line and the input terminal of the drive circuit based on a second reset control signal provided by the second reset control line.

In some embodiments, during a frame refresh period of the display panel, the initial power line is configured to provide an initial power signal of a first potential,

- and during a frame hold period of the display panel, the initial power line is configured to provide an initial power signal of a second potential, wherein the first potential is different from the second potential.

According to some embodiments, a display device is provided. The display device includes a power supply assembly and the display panel according to any of the above embodiments,

- wherein the power supply assembly is coupled to the display panel and is configured to supply power to the display panel.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
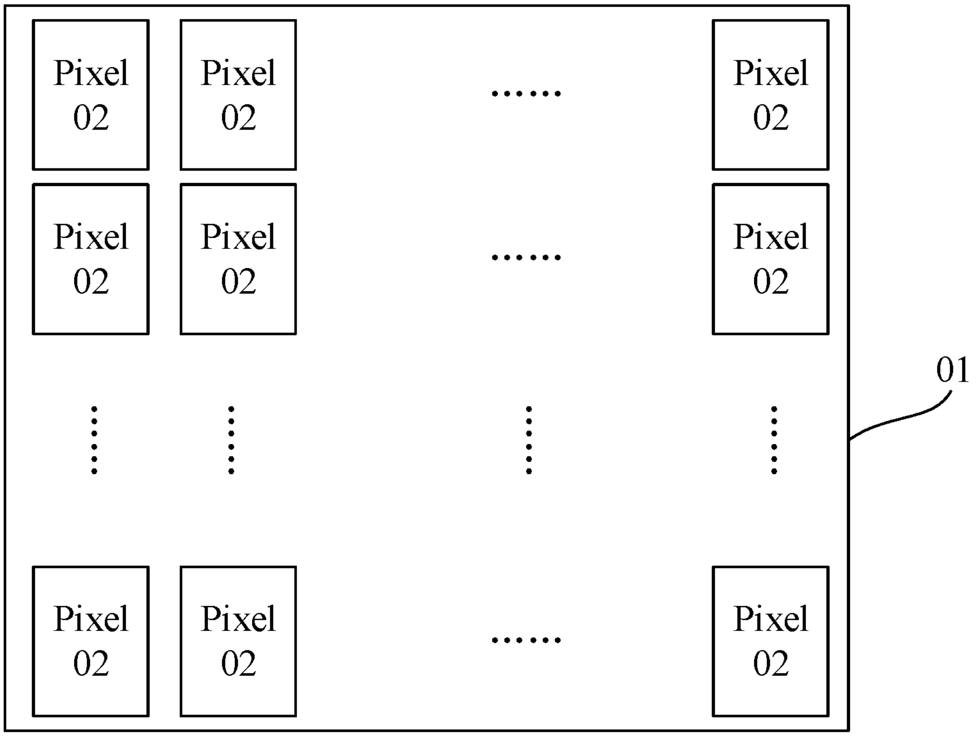
FIG. 1 is a schematic structural diagram of a display panel according to some embodiments of the present disclosure.

For clearer descriptions of the objectives, technical solutions, and advantages of the present disclosure, embodiments of the present disclosure are further described in detail below with reference to the accompanying drawings.

The transistors employed in all the embodiments disclosed herein can all be field-effect transistors or devices with similar characteristics. The transistors employed in the embodiments disclosed herein are primarily switch transistors based on their function in the circuit. Since the switch transistors employed herein have a symmetrical source and drain, the source and drain are interchangeable. In the embodiments disclosed herein, the source is referred to as the first electrode, and the drain is referred to as the second electrode. Alternatively, the drain is referred to as the first electrode, and the source terminal is referred to as the second electrode. As depicted in the accompanying drawings, the middle terminal of the transistor is designated as the gate, the signal input terminal as the source, and the signal output terminal as the drain. In addition, the switch transistors employed in the embodiments disclosed herein include either a P-type switch transistor or an N-type switch transistor. Specifically, the P-type switch transistor conducts when the gate is at a low level and cuts off when the gate is at a high level, while the N-type switch transistor conducts when the gate is at a high level and cuts off when the gate is at a low level. In addition, in each of the disclosed embodiments, multiple signals correspond to active and inactive potentials. The active and inactive potentials merely indicate that the potentials of the signals include two state quantities, and do not indicate that the active or inactive potentials throughout the entire text have specific numerical values.

The OLED display panel typically includes a substrate and a plurality of pixels disposed on one side of the substrate. Each pixel comprises a pixel circuit and a current-driven OLED light-emitting element. The pixel circuit is configured to transmit the drive current to the OLED light-emitting element, thereby driving the OLED light-emitting element to emit light. Currently, the transistors in the pixel circuit are made of a material known as low-temperature polycrystalline (LTPS), which possesses high electron mobility. Accordingly, these display panels are also referred to as LTPS-type OLED display panels.

In some practices, in display panels made of LTPS material such as OLED display panels, the Ioff of transistors within the pixel circuits (e.g., drive transistors for driving light-emitting elements) typically ranges around $E^{-13}$, signifying a certain level of current leakage. This tendency leads to potential occurrences of screen flickering, as described in the background. Moreover, this flickering becomes more apparent during low-frequency displays. The reason behind this is that as the frequency decreases, the duration required to display a frame of an image increases correspondingly, and the duration of leakage also increases consequently. When the accumulated current leakage within a frame reaches a certain level, it results in changes in the display brightness of the display panel, easily perceivable by the human eye, manifesting as screen flickering.

To address the aforementioned screen flickering, it is necessary to stabilize the gate potential of the drive transistors, ensuring reduced current leakage within a frame during low-frequency displays. Extensive experimental research has revealed that if the current leakage within a frame can be maintained below 5%, the flickering phenomenon can be mitigated, even rendering it imperceptible to the human eye. Consequently, current efforts involve attempts to improve low-frequency display performance by incorporating transistors made of materials such as indium gallium zinc oxide (IGZO) around the gate of the drive transistors to block leakage paths. However, this arrangement necessitates the introduction of the IGZO process, leading to an increased number of masks required for manufacturing display panels. This impacts production capacity negatively, hampering the mass production of display panels.

Based on this, a display panel is provided according to the embodiments disclosed herein that effectively alleviates screen flickering while being conducive to mass production of the display panel.

FIG. 1 is a schematic structural diagram of a display panel according to some embodiments of the present disclosure. As illustrated in FIG. 1, the display panel includes a substrate 01 and a plurality of pixels 02 disposed on the substrate 01.

Figure 2:
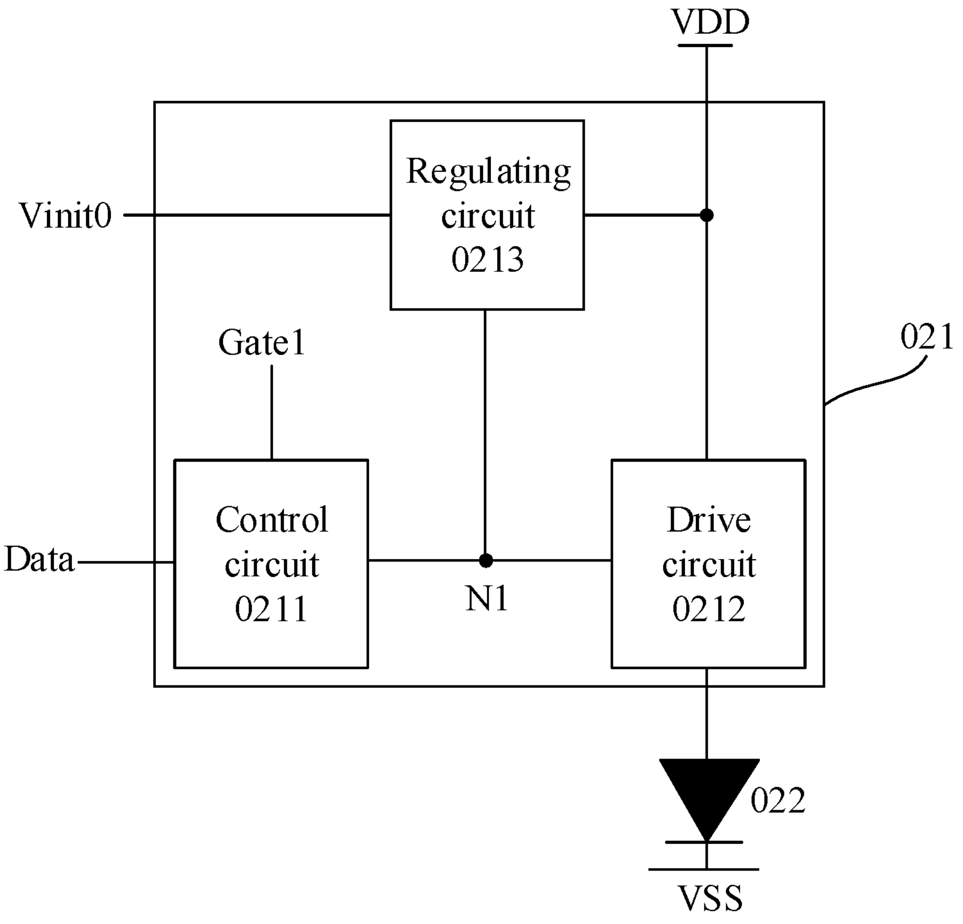
FIG. 2 is a schematic structural diagram of a pixel circuit according to some embodiments of the present disclosure.

Based on FIG. 1 and referring to FIG. 2, it can be observed that each pixel 02 includes a pixel circuit 021 and a light-emitting element 022. The pixel circuit 021 is coupled to the light-emitting element 022 and is configured to drive the light-emitting element 022 to emit light. The pixel circuit 021 includes a control circuit 0211, a drive circuit 0212, and a regulating circuit 0213.

The control circuit 0211 is coupled (i.e., electrically connected) respectively to the gate line Gate1, the data line Data, and the control node N1. The control circuit 0211 is configured to control the potential of the control node N1 based on the gate drive signal provided by the gate line Gate1 and the data signal provided by the data line Data.

The control terminal of the drive circuit 0212 is coupled to the control node N1, the input terminal of the drive circuit 0212 is coupled to the drive power line VDD, and the output terminal of the drive circuit 0212 is coupled to the light-emitting element 022. The drive circuit 0212 is configured to transmit a drive signal (e.g., a drive current) to the light-emitting element 022 based on the potential of the control node N1 and the drive power signal provided by the drive power line VDD, thereby driving the light-emitting element 022 to emit light. Accordingly, the drive circuit 0212 here includes the drive transistors as described in the aforementioned embodiments. Moreover, in the embodiments disclosed herein, the material for the drive transistors is LTPS, which exhibits a certain level of Ioff.

In some embodiments, referring to FIG. 2, it can be observed that the output terminal of the drive circuit 0212 is coupled to the first electrode of the light-emitting element 022, while the second electrode of the light-emitting element 022 is coupled to the pull-down power line VSS. The light-emitting element 022 emits light based on the voltage difference between the drive signal received at its first electrode and the pull-down power signal provided by the pull-down power line VSS. Moreover, for the first electrode and second electrode of the light-emitting element 022, one electrode serves as the anode, and the other electrode serves as the cathode. For example, as illustrated in FIG. 2, the first electrode is the anode, and the second electrode is the cathode.

The regulating circuit 0213 is coupled respectively to the drive power line VDD, the control node N1, and the initial power line Vinit0. The regulating circuit 0213 is configured to regulate the potential of the control node N1 through the coupling effect based on the initial power signal provided by the initial power line Vinit0 and the drive power signal provided by the drive power line VDD.

The flexible adjustment of the initial power signal increases, to some extent, the capacitance value at the control node N1, and reduces the impact of the cutoff current (Ioff) of the drive transistor in the drive circuit 0212 on the potential at the control node N1, resulting in better stability of the potential at the control node N1. Moreover, the channel electric field strength of the drive transistors can also be altered, and the electric field influences the distribution of defect particles at the channel interface, thereby adjusting the hysteresis state of the drive transistors. Combining the above two aspects improves the retention rate of the potential at the control node N1 within a frame, reducing the current leakage of the drive transistors. This improvement effectively alleviates screen flickering in the display panel, ensuring better display performance. The improvement is particularly noticeable during low-frequency displays (e.g., 40 Hz, 30 Hz, or even 24 Hz) of the display panel. In addition, since the regulating circuit 0213 adjusts the potential at the control node N1 through the coupling effect, the regulating circuit 0213 described in the embodiments disclosed herein is a non-transistor device such as a capacitor. Thus, compared with current transistors made of IGZO material, the manufacturing process for the display panel according to the embodiments disclosed herein is simpler and requires fewer masks, making it more suitable for mass production.

In summary, a display panel is provided according to the embodiments disclosed herein. The pixel circuit in the display panel includes a control circuit, a drive circuit, and a regulating circuit. The control circuit controls the potential of the coupled control node based on the gate drive signal provided by the gate line and the data signal provided by the data line. The drive circuit drives the light-emitting element to emit light based on the potential of the control node and the drive power signal provided by the drive power line. The regulating circuit adjusts the potential of the control node through the coupling effect based on the drive power signal and the initial power signal provided by the initial power line. The flexible adjustment of the initial power signal enhances the stability of the potential at the control node, and reduces the current leakage of the drive transistor within the drive circuit, thereby alleviating screen flickering in the display panel, and ensuring a better display performance of the display panel.

Figure 3:
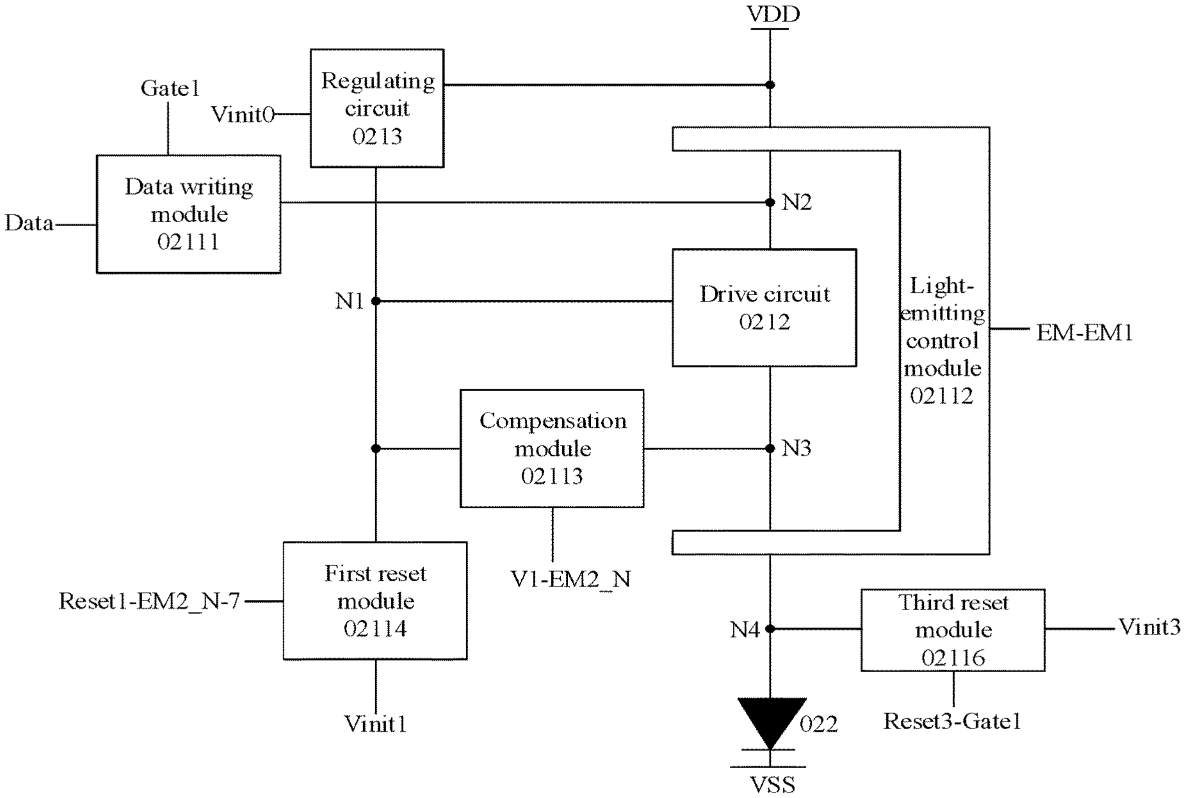
FIG. 3 is a schematic structural diagram of another pixel circuit according to some embodiments of the present disclosure.

In some embodiments, FIG. 3 is a schematic structural diagram of another pixel circuit according to some embodiments of the present disclosure. As illustrated in FIG. 3, the control circuit 0211 described in the embodiments disclosed herein includes a data writing module 02111, a light-emitting control module 02112, a compensation module 02113, and a first reset module 02114.

The data writing module 02111 is coupled respectively to the gate line Gate1, the data line Data, and the input terminal of the drive circuit 0212 (identified as node N2 in the figure). The data writing module 02111 is configured to control the connection and disconnection between the data line Data and the input terminal of the drive circuit 0212 based on the gate drive signal.

For example, the data writing module 02111, in the case that the potential of the gate drive signal is the first potential, enables the connection between the data line Data and the input terminal of the drive circuit 0212. At this point, the data signal provided by the data line Data is transmitted to the input terminal of the drive circuit 0212 to charge the input terminal of the drive circuit 0212. Moreover, the data writing module 02111, in the case that the potential of the gate drive signal is the second potential, decouples the data line Data from the input terminal of the drive circuit 0212.

In some embodiments disclosed herein, the first potential is the active potential, the second potential is the inactive potential, and the first potential is a lower potential relative to the second potential. Additionally, in some other embodiments, the first potential is a higher potential relative to the second potential.

The light-emitting control module 02112 is coupled respectively to the light-emitting control line EM, the drive power line VDD, the input terminal of the drive circuit 0212, the output terminal of the drive circuit 0212 (identified as node N3 in the figure), and the light-emitting element 022 (identified as node N4 in the figure). The light-emitting control module 02112 is configured to, based on the light-emitting control signal provided by the light-emitting control line EM, control the connection and disconnection between the drive power line VDD and the input terminal of the drive circuit 0212 and to control the connection and disconnection between the output terminal of the drive circuit 0212 and the light-emitting element 022.

For example, the light-emitting control module 02112, in the case that the potential of the light-emitting control signal is the first potential, enables the connection between the drive power line VDD and the input terminal of the drive circuit 0212 as well as the connection between the output terminal of the drive circuit 0212 and the light-emitting element 022. At this point, the drive power signal provided by the drive power line VDD is transmitted to the input terminal of the drive circuit 0212, and the potential at the output terminal of the drive circuit 0212 is further transmitted to the light-emitting element 022. Moreover, the light-emitting control module 02112, in the case that the potential of the light-emitting control signal is the second potential, decouples the drive power line VDD from the input terminal of the drive circuit 0212 and decouples the output terminal of the drive circuit 0212 from the light-emitting element 022. In other words, the drive circuit 0212 is indirectly coupled to the drive power line VDD and the light-emitting element 022 via this light-emitting control module 02112.

The compensation module 02113 is coupled respectively to the compensation control line V1, the output terminal of the drive circuit 0212 (i.e., node N3), and the control node N1. The compensation module 02113 is configured to control the connection and disconnection between the output terminal of the drive circuit 0212 and the control node N1 based on the compensation control signal provided by the compensation control line V1.

For example, the compensation module 02113, in the case that the potential of the compensation control signal is the first potential, enables the connection between the output terminal of the drive circuit 0212 and the control node N1. Moreover, the compensation module 02113, in the case that the potential of the compensation control signal is the second potential, decouples the output terminal of the drive circuit 0212 from the control node N1.

The first reset module 02114 is coupled respectively to the first reset control line Reset1, the first reset power line Vinit1, and the control node N1. The first reset module 02114 is configured to control the connection and disconnection between the first reset power line Vinit1 and the control node N1 based on the first reset control signal provided by the first reset control line Reset1.

For example, the first reset module 02114, in the case that the potential of the first reset control signal is the first potential, enables the connection between the first reset power line Vinit1 and the control node N1. At this point, the first reset power signal provided by the first reset power line Vinit1 is transmitted to the control node N1, achieving a reset of the control node N1. Moreover, the first reset module 02114, in the case that the potential of the first reset control signal is the second potential, decouples the first reset power line Vinit1 from the control node N1.

Figure 4:
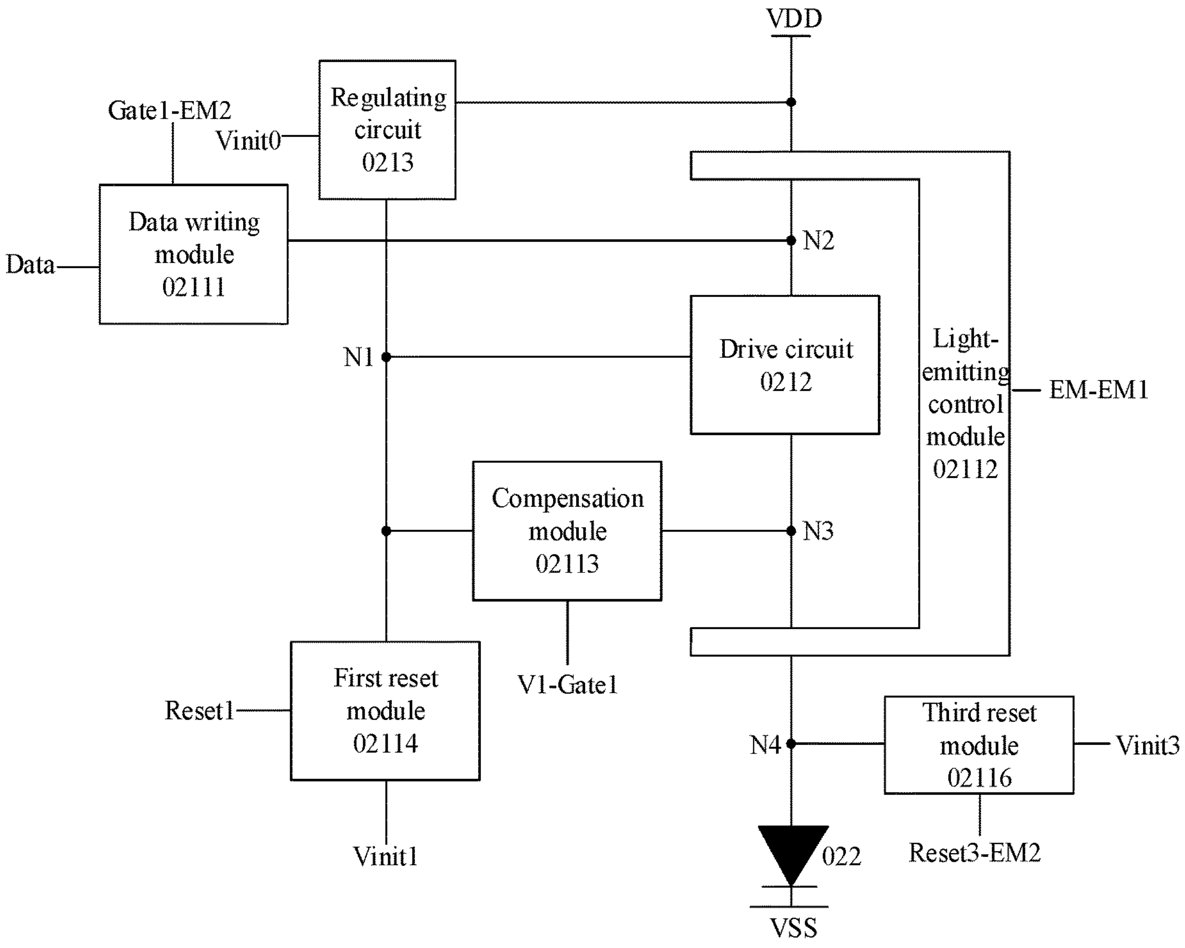
FIG. 4 is a schematic structural diagram of still another pixel circuit according to some embodiments of the present disclosure.

In some embodiments, as still another pixel circuit illustrated in FIGS. 3 and 4, the compensation control line V1 and the gate line Gate1 are independent of each other (i.e., represent different signal lines).

Based on this, within a refresh cycle, the period for the compensation control line V1 providing the compensation control signal of the active potential (i.e., the first potential) is overlapped with the period for the first reset control line Reset1 providing the first reset control signal of the active potential (i.e., the first potential). Additionally, the number of times that the compensation control line V1 provides the compensation control signal of the active potential and the number of times that the first reset control line Reset1 provides the first reset control signal of the active potential are both greater than or equal to 3.

As described in the aforementioned embodiments, the compensation control signal of the active potential is configured to enable the connection between the output terminal of the drive circuit 0212 and the control node N1, and the first reset control signal of the active potential is configured to enable the connection between the first reset power line and the control node N1. Accordingly, the period for the compensation control line V1 providing the compensation control signal of the active potential is also referred to as the turn-on period of the compensation control line V1. Similarly, the period for the first reset control line Reset1 providing the first reset control signal of the active potential is also referred to as the turn-on period of the first reset control line Reset1. The turn-on periods of both are overlapped, and the number of turn-on times for each is greater than or equal to 3.

In some embodiments, referring to FIGS. 3 and 4, the illustrated light-emitting control line EM to which the pixel circuit is coupled includes a first light-emitting control line EM1 and a second light-emitting control line EM2. The light-emitting control module 02112 is coupled to the first light-emitting control line EM1.

Additionally, in FIG. 3, the compensation control line V1 coupled to the compensation module 02113 and the first reset control line Reset1 coupled to the first reset module 02114 are both shared with the second light-emitting control line EM2. The compensation control line V1 is shared with the N-th second light-emitting control line EM2_N, and the first reset control line Reset1 coupled to the first reset module 02114 is shared with the N−7-th second light-emitting control line EM2_N−7, where N is an integer greater than 7. That is, the light-emitting control line EM2 is connected to the compensation module 02113 and the first reset module 02114.

In some embodiments, the period for the N−7-th second light-emitting control line EM2_N−7 providing the signal of the active potential (i.e., the turn-on period of the second light-emitting control line EM2_N−7) is overlapped with the period for the N-th second light-emitting control line EM2_N providing the signal of the active potential (i.e., the turn-on period of the second light-emitting control line EM2_N). Additionally, the period for the N-th second light-emitting control line EM2_N providing the signal of the active potential is overlapped with the period for the gate line Gate1 providing the gate drive signal of the active potential. The gate drive signal of active potential is configured to enable the connection between the data line Data and the input terminal of the drive circuit 0212. Accordingly, the period for the gate line Gate1 providing the gate drive signal of active potential is referred to as the turn-on period of the gate line Gate1.

Alternatively, in FIG. 4, the compensation control line V1 coupled to the compensation module 02113 is shared with the gate line Gate1. Based on this, the gate line Gate1 coupled to the data writing module 02111 is shared with the second light-emitting control line EM2. In other words, the compensation module 02113 is coupled to the gate line Gate1, while the data writing module 02111 is coupled to the second light-emitting control line EM2.

Figure 5:
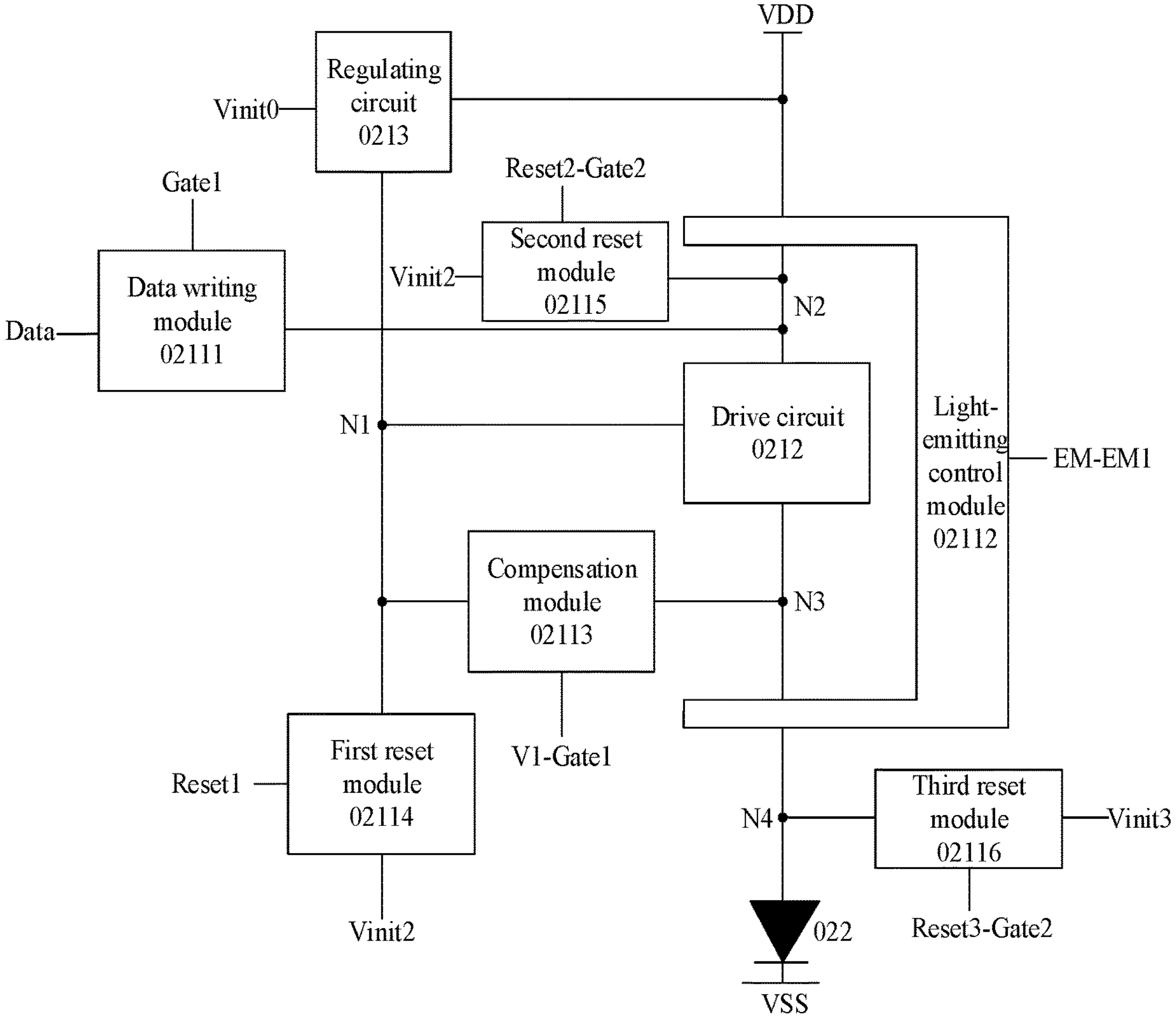
FIG. 5 is a schematic structural diagram of yet still another pixel circuit according to some embodiments of the present disclosure.

In some embodiments, as yet still another pixel circuit illustrated in FIG. 5, the compensation control line V1 is shared with the gate line Gate1. That is, both the compensation module 02113 and the data writing module 02111 are coupled to the gate line Gate1. Based on this, the control circuit 0211 further includes a second reset module 02115.

The second reset module 02115 is coupled respectively to the second reset control line Reset2, the second reset power line Vinit2, and the input terminal (i.e., node N2) of the drive circuit 0212. The second reset module 02115 is configured to control the connection and disconnection between the second reset power line Vinit2 and the input terminal of the drive circuit 0212 based on the second reset control signal provided by the second reset control line Reset2.

For example, the second reset module 02115, in the case that the potential of the second reset control signal is the first potential, enables the connection between the second reset power line Vinit2 and the input terminal of the drive circuit 0212. At this point, the second reset power signal provided by the second reset power line Vinit2 is transmitted to the input terminal of the drive circuit 0212, achieving a reset of the input terminal of the drive circuit 0212. Moreover, the second reset module 02115, in the case that the potential of the second reset control signal is the second potential, decouples the second reset power line Vinit2 from the input terminal of the drive circuit 0212.

In some embodiments, referring to FIGS. 3 to 5, it can also be observed that the control circuit 0211 according to the embodiments disclosed herein further includes a third reset module 02116. The third reset module 02116 is coupled respectively to the third reset control line Reset3, the third reset power line Vinit3, and the light-emitting element 022 (i.e., node N4). The third reset module 02116 is configured to control the connection and disconnection between the third reset power line Vinit3 and the light-emitting element 022 based on the third reset control signal provided by the third reset control line Reset3.

For example, the third reset module 02116, in the case that the potential of the third reset control signal is the first potential, enables the connection between the third reset power line Vinit3 and the light-emitting element 022. At this point, the third reset power signal provided by the third reset power line Vinit3 is transmitted to the light-emitting element 022, achieving a reset of the light-emitting element 022. Moreover, the third reset module 02116, in the case that the potential of the third reset control signal is the second potential, decouples the third reset power line Vinit3 from the light-emitting element 022.

It should be noted that with respect to the structure illustrated in FIG. 3, the third reset control line Reset3 is shared with the gate line Gate1. That is, both the third reset module 02116 and the data writing module 02111 are coupled to the gate line Gate1. With respect to the structure illustrated in FIG. 4, the third reset control line Reset3 is shared with the second light-emitting control line EM2. That is, both the third reset module 02116 and the data writing module 02111 are coupled to the second light-emitting control line EM2. With respect to the structure illustrated in FIG. 5, the third reset control line Reset3 is shared with the second reset control line Reset2. That is, both the third reset module 02116 and the second reset module 02115 are coupled to the same reset control line. Additionally, the reset control line is another gate line Gate2.

Figure 6:
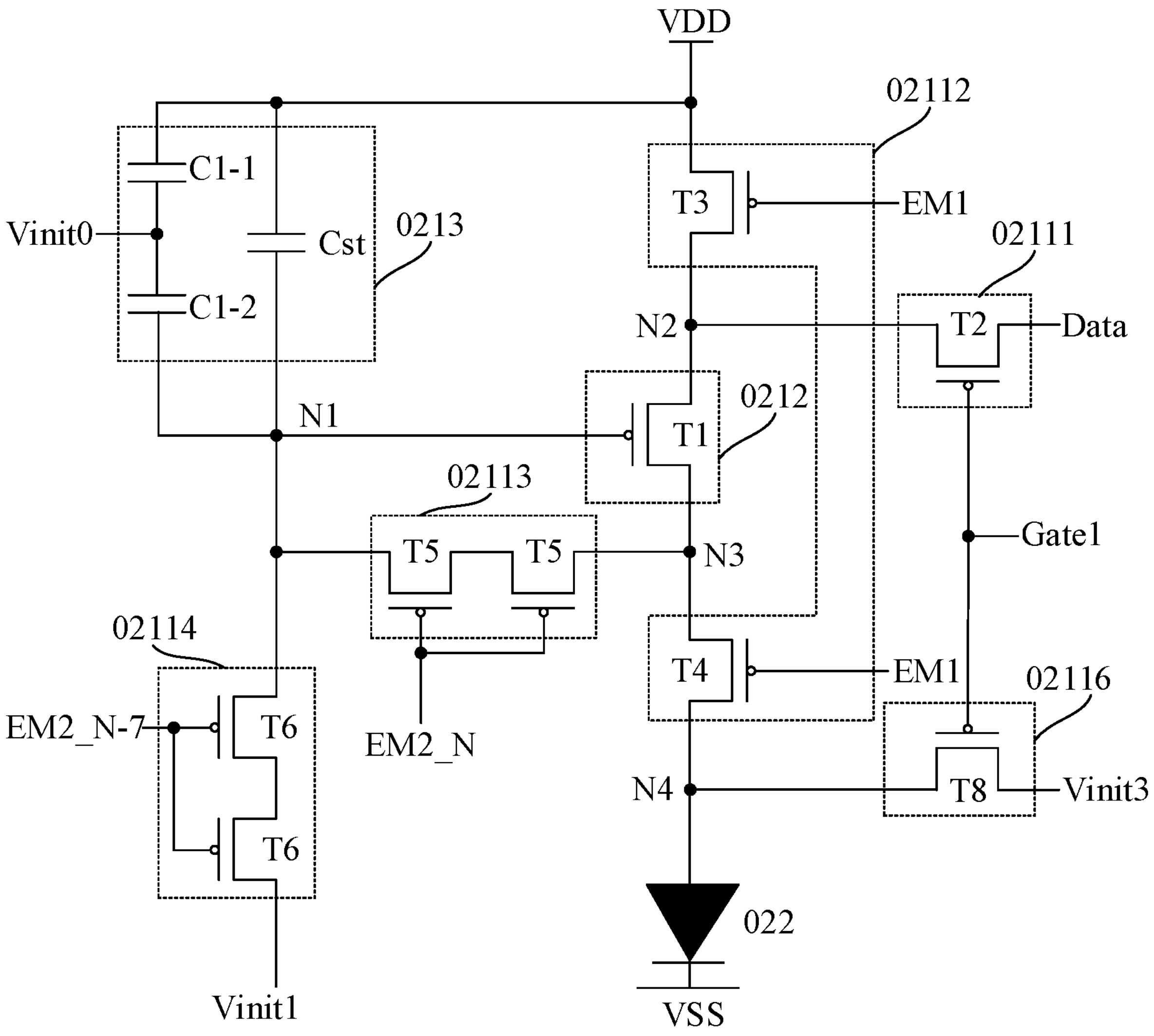
FIG. 6 is a schematic structural diagram of yet still another pixel circuit according to some embodiments of the present disclosure.
Figure 7:
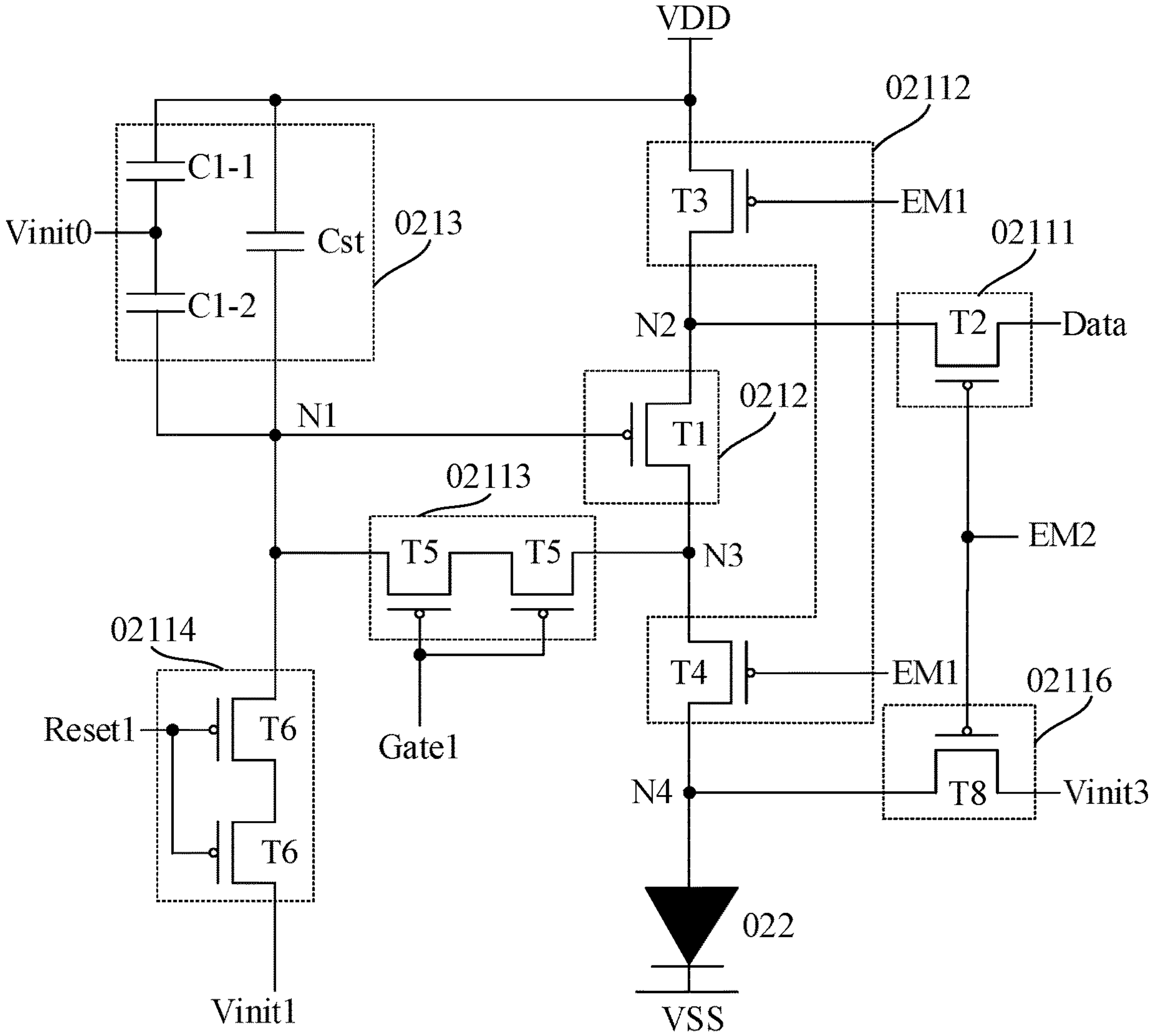
FIG. 7 is a schematic structural diagram of yet still another pixel circuit according to some embodiments of the present disclosure.

In some embodiments, based on FIG. 3, FIG. 6 illustrates a schematic structural diagram of yet still another pixel circuit. Based on FIG. 4, FIG. 7 illustrates a schematic structural diagram of yet still another pixel circuit. Based on FIG. 5, FIG. 8 illustrates a schematic structural diagram of yet still another pixel circuit.

Figure 8:
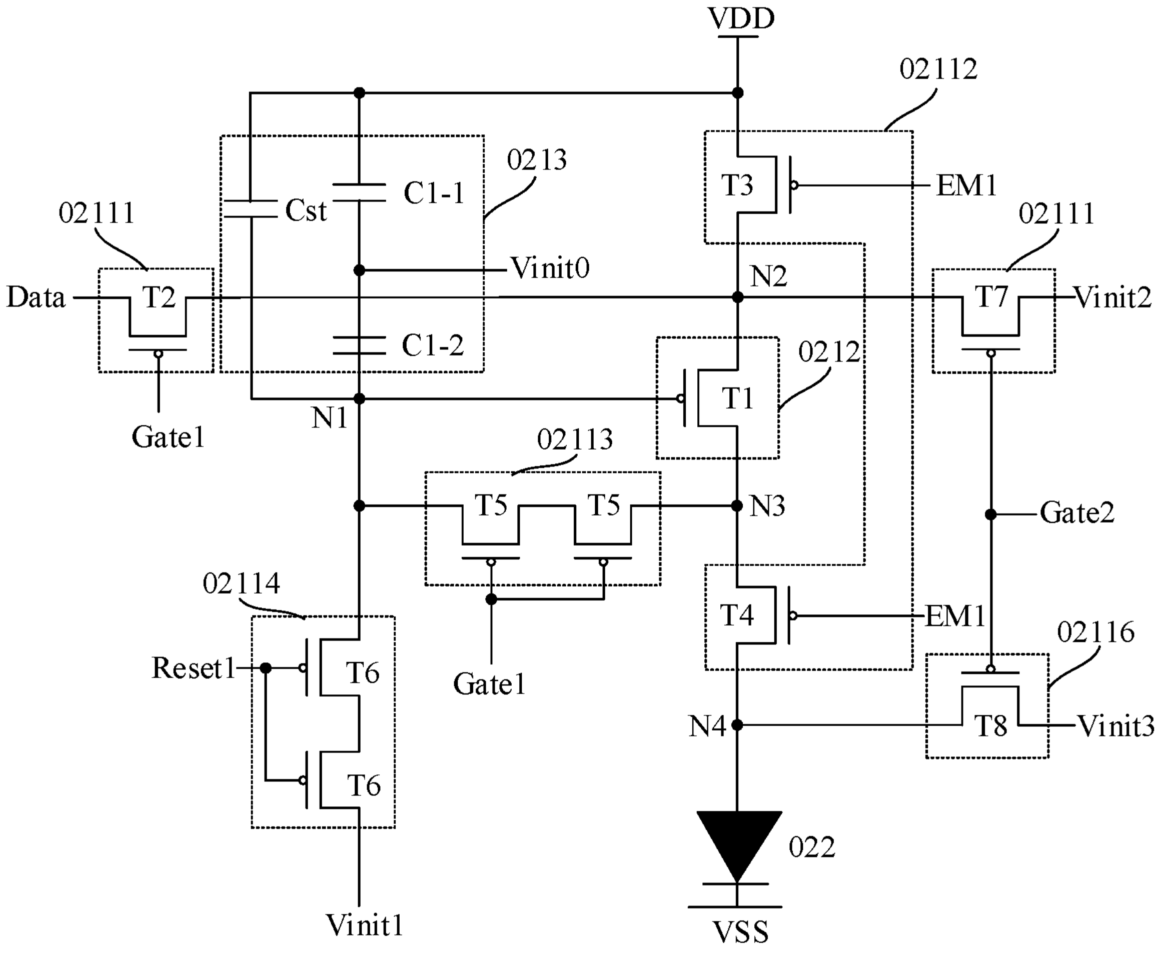
FIG. 8 is a schematic structural diagram of yet still another pixel circuit according to some embodiments of the present disclosure.

Referring to FIGS. 6 to 8, it can also be observed that the drive circuit 0212 includes a drive transistor T1. The regulating circuit 0213 includes at least one regulation capacitor C1 and a storage capacitor Cst.

The gate of the drive transistor T1 is coupled to the control node N1, the first electrode of the drive transistor T1 is coupled to the drive power line VDD, and the second electrode of the drive transistor T1 is coupled to the light-emitting element 022. For example, the second electrode of the drive transistor T1 is coupled to the anode of the light-emitting element 022.

The at least one regulation capacitor C1 is connected in series between the drive power line VDD and the control node N1, and the at least one regulation capacitor C1 is also coupled to the initial power line Vinit0.

The storage capacitor Cst is connected in series between the drive power line VDD and the control node N1.

Exemplarily, each regulating circuit 0213 illustrated in FIGS. 6 to 8 includes two regulation capacitors C1. For differentiation, the two regulation capacitors C1 are identified as C1-1 and C1-2, respectively. The regulation capacitors C1-1 and C1-2 are connected in series between the drive power line VDD and the control node N1. The coupling node between the regulation capacitors C1-1 and C1-2 is coupled to the initial power line Vinit0.

That is, the embodiments disclosed herein stabilize the potential of the control node N1 by arranging the regulation capacitors C1 coupled to the initial power line Vinit0, thereby reducing the current leakage of the drive transistor T1 and alleviating screen flickering in the display panel.

In some embodiments, referring to FIGS. 6 to 8, it can also be observed that the data writing module 02111 includes a data writing transistor T2; the light-emitting control module 02112 includes a first light-emitting control transistor T3 and a second light-emitting control transistor T4; the compensation module 02113 includes a compensation transistor T5; the first reset module 02114 includes a first reset transistor T6; the second reset module 02115 includes a second reset transistor T7; and the third reset module 02116 includes a third reset transistor T8.

In the structures illustrated in FIGS. 6 and 8, the gate of the data writing transistor T2 is coupled to the gate line Gate1. While in the structure illustrated in FIG. 7, the gate of the data writing transistor T2 is coupled to the second light-emitting control line EM2. In addition, in the structures illustrated in FIGS. 6 to 8, the first electrode of the data writing transistor T2 is coupled to the data line Data, and the second electrode of the data writing transistor T2 is coupled to node N2.

In the structures illustrated in FIGS. 6 to 8, the gate of the first light-emitting control transistor T3 is coupled to the first light-emitting control line EM1, the first electrode of the first light-emitting control transistor T3 is coupled to the drive power line VDD, and the second electrode of the first light-emitting control transistor T3 is coupled to the node N2.

In the structures illustrated in FIGS. 6 to 8, the gate of the second light-emitting control transistor T4 is coupled to the first light-emitting control line EM1, the first electrode of the second light-emitting control transistor T4 is coupled to the node N3, and the second electrode the second light-emitting control transistor T4 is coupled to the node N4.

In the structure illustrated in FIG. 6, the gate of the compensation transistor T5 is coupled to the second light-emitting control line EM2_N. While in the structures illustrated in FIGS. 7 and 8, the gate of the compensation transistor T5 is coupled to the gate line Gate1. In addition, in the structures illustrated in FIGS. 6 to 8, the first electrode of the compensation transistor T5 is coupled to the node N3, and the second electrode of the compensation transistor T5 is coupled to the control node N1.

In the structure illustrated in FIG. 6, the gate of the first reset transistor T6 is coupled to the second light-emitting control line EM2_N−7. While in the structures illustrated in FIGS. 7 and 8, the gate of the first reset transistor T6 is coupled to the first reset control line Reset1. In addition, in the structures illustrated in FIGS. 6 to 8, the first electrode of the first reset transistor T6 is coupled to the first reset power line Vinit1, and the second electrode of the first reset transistor T6 is coupled to the control node N1.

In the structure illustrated in FIG. 8, the gate of the second reset transistor T7 is coupled to the gate line Gate2 (as the second reset control line Reset2), the first electrode of the second reset transistor T7 is coupled to the second reset power line Vinit2, and the second electrode the second reset transistor T7 is coupled to the node N2.

Moreover, in the structure illustrated in FIG. 6, the gate of third reset transistor T8 is coupled to the gate line Gate1 (as the third reset control line Reset3); in the structure illustrated in FIG. 7, the gate of third reset transistor T8 is coupled to the second light-emitting control line EM2 (as the third reset control line Reset3); and in the structure illustrated in FIG. 8, the gate of third reset transistor T8 is coupled to the gate line Gate2 (as the third reset control line Reset3). In addition, in the structures illustrated in FIGS. 6 to 8, the first electrode of the third reset transistor T8 is coupled to the third reset power line Vinit3, and the second electrode of the third reset transistor T8 is coupled to the node N4.

In some embodiments, referring to FIGS. 6 to 8, it can also be observed that both the compensation transistor T5 and the first reset transistor T6 include two transistors in series, equivalent to a dual-gate transistor. This ensures reduced leakage currents and better operational stability for both the compensation transistor T5 and the first reset transistor T6. Additionally, in some other embodiments, besides the compensation transistor T5 and the first reset transistor T6, other transistors (e.g., the second reset transistor T7) may also be dual-gate transistors.

In some embodiments disclosed herein, referring to FIGS. 6 to 8, it can also be observed that the transistors in the pixel circuit 021 are all P-type transistors. Accordingly, as described in the aforementioned embodiments, the first potential is a lower potential relative to the second potential. In addition, the material of P-type transistors includes the LTPS material described in the aforementioned embodiments. Here, the material of the transistors refers to the material of their active layers.

It should be noted that apart from the regulation capacitor C1, the pixel circuit structures illustrated in FIGS. 6 and 7 are considered as a 7T1C structure (i.e., including 7 transistors and 1 capacitor), while the structure illustrated in FIG. 8 is considered an 8T1C structure. The distinction between FIGS. 6 and 7 lies in that the compensation transistor T5 and the first reset transistor T6 are driven by using either the gate line Gate1 and the first reset control line Reset1 respectively or by using either the second light-emitting control lines EM2_N and EM2_N−7 respectively. That is, the regulation capacitor C1 arranged according to the embodiments disclosed herein is applicable not only to the 7T1C structured pixel circuit but also to the 8T1C structured pixel circuit. Additionally, in some other embodiments, the regulation capacitor C1 is applicable to pixel circuits of different structures (e.g., 10T1C), and the embodiments disclosed herein do not limit their application to only these structures.

Figure 9:
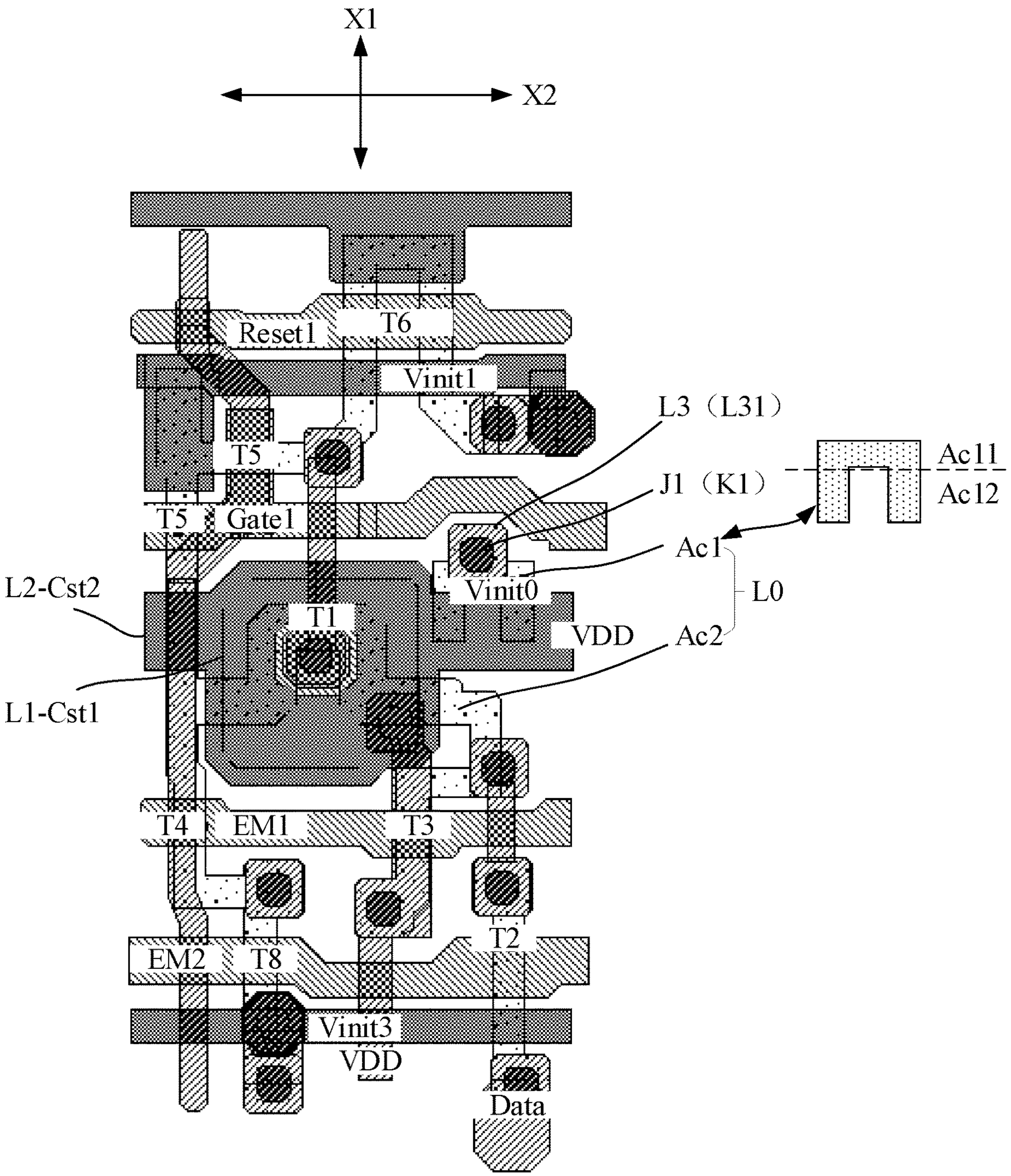
FIG. 9 is a structural layout of a pixel circuit according to some embodiments of the present disclosure.

Taking the circuit structure illustrated in FIG. 7 as an example, FIG. 9 illustrates a structural layout of a pixel circuit. Referring to FIG. 9, it can be observed that the display panel described in the embodiments disclosed herein further includes a semiconductor layer L0, a first metal layer L1, and a second metal layer L2 sequentially laminated on a side, distal to the substrate 01, of the substrate 01.

The semiconductor layer L0 is configured to form a first active layer Ac1 of the at least one regulation capacitor C1 and a second active layer Ac2 of the drive transistor T1. The first metal layer L1 and the second metal layer L2 are respectively configured to form a first capacitor plate Cst1 and a second capacitor plate Cst2 of the storage capacitor Cst. With reference to FIGS. 6 to 8, it can be observed that the first capacitor plate Cst1 is coupled to the control node N1, and the second capacitor plate Cst2 is coupled to the drive power line VDD. In other words, the drive power line VDD is disposed at the same layer as the second metal layer L2.

In addition, the orthographic projection of the first active layer Ac1 onto the substrate 01 and the orthographic projection of the second active layer Ac2 onto the substrate 01 are both overlapped with the orthographic projection of the second capacitor plate Cst2 onto the substrate 01.

In some embodiments, taking the pixel circuits illustrated in FIGS. 6 to 8 as an example, the regulating circuit 0213 includes two regulation capacitors C1. The overlapping portion between the first active layer Ac1 and the second capacitor plate Cst2 is configured to form one of the two regulation capacitors C1, which is connected in series between the drive power line VDD and the initial power line Vinit0 (i.e., C1-1). The adjacent portion of the first active layer Ac1 and the first capacitor plate Cst1 (e.g., the laterally close portions) is configured to form the other of the two regulation capacitors C1, which is connected in series between the initial power line Vinit0 and the control node N1 (i.e., C1-2). Accordingly, the regulation capacitor C1-1 refers to the interplate capacitor formed between the first active layer Ac1 and the second metal layer L2, which is on the same layer as the drive power line VDD. The regulation capacitor C1-2 refers to the lateral capacitor formed between the first active layer Ac1 and the first metal layer L1, which is on the same layer as the first capacitor plate Cst1 (i.e., control node N1).

In some embodiments, referring to FIG. 9, it can be observed that the first active layer Ac1 includes a first active portion Ac11 and a second active portion Ac12 connected in the first direction X1. The orthographic projection of the second active portion Ac12 onto substrate 01 is overlapped with the orthographic projection of the second capacitor plate Cst2 (i.e., the second metal layer L2) onto substrate 01, and the orthographic projection of the first active portion Ac11 onto substrate 01 is not overlapped with the orthographic projection of the second capacitor plate Cst2 onto substrate 01.

In addition, the display panel further includes an insulating layer J1 and a third metal layer L3 disposed on one side of the second metal layer L2 distal to the substrate 01. The third metal layer L3 is configured to form a metal portion L31 coupled to the initial power line Vinit0. In addition, the metal portion L31 is overlapped with the first active portion Ac12 through a via hole K1 penetrating the insulating layer J1, allowing the initial power line Vinit0 to be coupled to at least one regulation capacitor C1.

That is, the orthographic projection of the portion where the metal portion L31 is overlapped with the first active layer Ac1 onto the substrate 01 is not overlapped with the orthographic projection of the second capacitor plate Cst2 onto substrate 01.

In some embodiments, the metal portion L31 includes a first metal segment extending along a first direction X1. And/or, the metal portion L31 includes a second metal segment extending along a second direction X2.

The second direction X2 intersects with the first direction X1. For example, as illustrated in FIG. 1, a plurality of pixels 02 are arrayed in a row-column manner. Accordingly, the first direction X1 represents the pixel row direction, the second direction X2 represents the pixel column direction, and the first direction X1 is perpendicular to the second direction X2.

That is, in the embodiments disclosed herein, the initial power line Vinit is not limited to a specific connection path to the regulation capacitor C1. The initial power line may vertically (e.g., along the first direction X1, i.e., the pixel row direction) penetrate through the substrate 01 to connect to each pixel 02, or horizontally (e.g., along the second direction X2, i.e., the pixel column direction) penetrate through the substrate 01 to connect to each pixel 02. Moreover, within spatial constraints, the initial power line may penetrate through the substrate 01 in both horizontal and vertical directions in a mesh-like manner to connect to each pixel 02. The mesh-like layout reduces the loading.

In some embodiments, referring to FIG. 9, it can also be observed that the area of the orthographic projection of the first active portion Ac11 onto the substrate 01 is smaller than the area of the orthographic projection of the second active portion Ac12 onto the substrate 01. That is, the overlapping area between the first active layer Ac1 and the second capacitor plate Cst2 is larger. This ensures the resulting regulation capacitor C1 has a larger capacitance value, thereby stabilizing the potential of the control node N1 more effectively and alleviating screen flickering.

In some embodiments, referring to FIG. 9, it can also be observed that in the first direction X1, the first active layer Ac1 and the second active layer Ac2 are arranged in a staggered manner. In the second direction X2 that intersects with the first direction X1, the first active layer Ac1 and the second active layer Ac2 are arranged at intervals.

In some embodiments, referring to FIG. 9, it can also be observed that the orthographic projection of the first active layer Ac1 onto the substrate 01 is U-shaped. In addition, the opening of the U-shaped first active layer Ac1 faces the second capacitor plate Cst2 and is overlapped with the second capacitor plate Cst2. Additionally, in some other embodiments, the opening of the U-shaped first active layer Ac1 faces away from the second capacitor plate Cst2, with the non-opening end overlapping with the second capacitor plate Cst2. Moreover, the orthographic projection of the first active layer Ac1 onto the substrate 01 may take other shapes, such as an L-shape.

It should be noted that FIG. 9 also schematically identifies the positions of other transistors and signal lines. In addition, the first metal layer L1 is the first gate metal layer in the display panel, the second metal layer L2 is the second gate metal layer in the display panel, the third metal layer L3 is the source-drain metal layer in the display panel, and the insulating layer J1 is the interlayer defining layer in the display panel.

Figure 10:
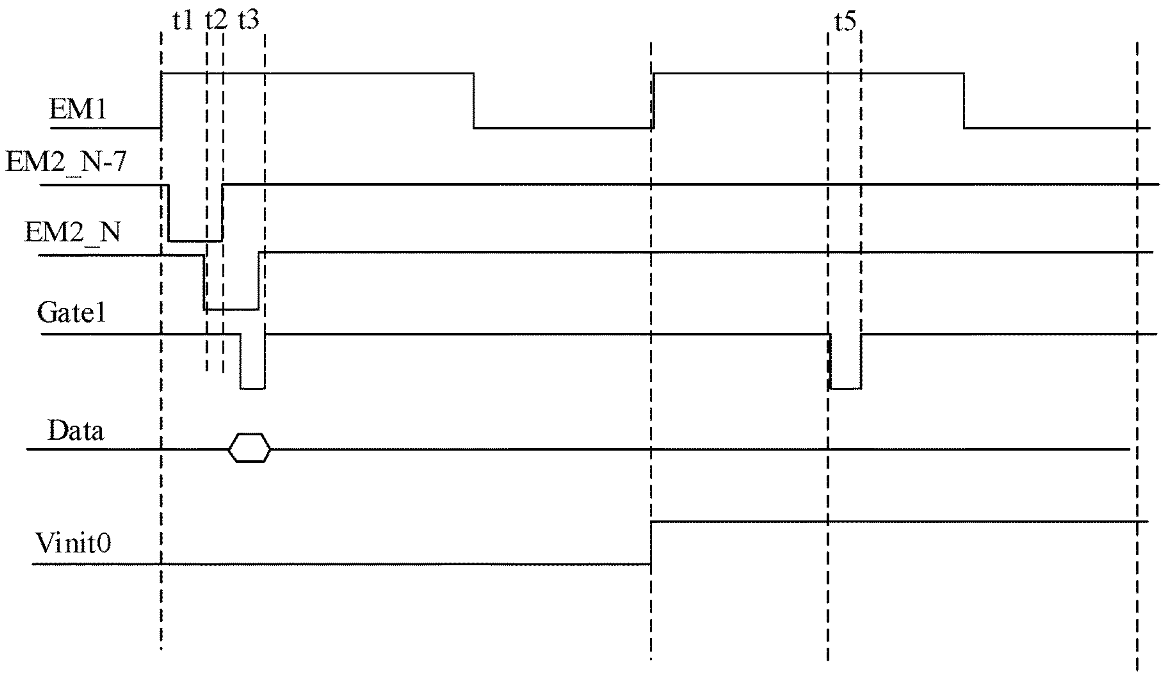
FIG. 10 is a signal timing diagram illustrated based on the structure shown in FIG. 6.
Figure 11:
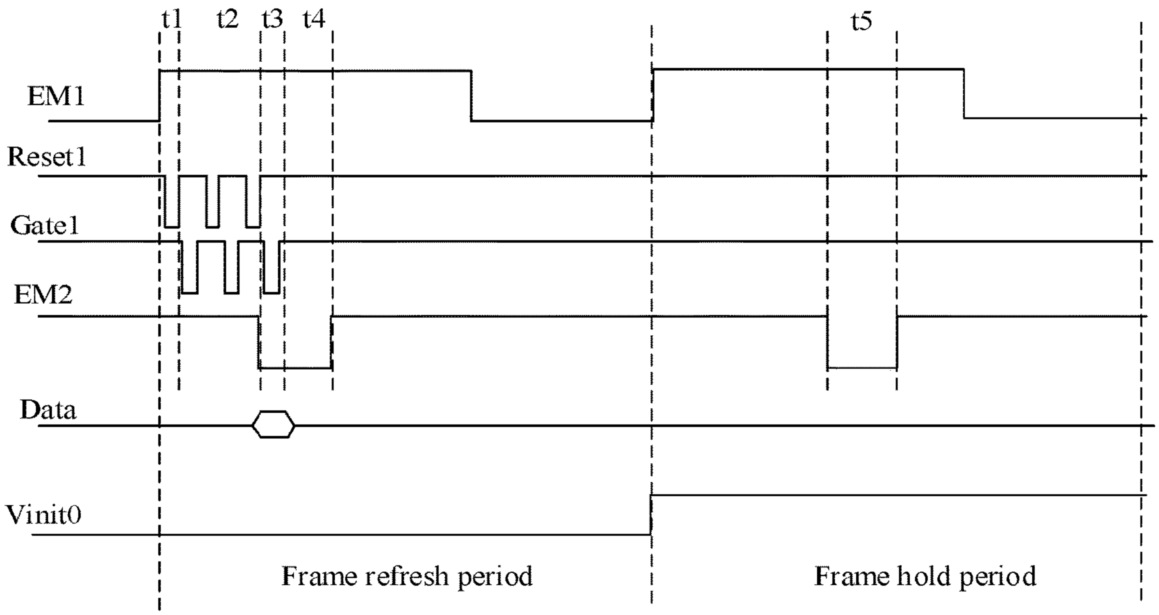
FIG. 11 is a signal timing diagram illustrated based on the structure shown in FIG. 7.

Taking the structures illustrated in FIGS. 6 and 7 as an example, where the transistors in the pixel circuit 021 are all P-type LTPS transistors, the first potential is a low potential, and the second potential is a high potential, an explanation of the operation principle of the pixel circuit 021 is provided below. FIG. 10 corresponds to the signal timing diagram of the structure illustrated in FIG. 6. FIG. 11 corresponds to the signal timing diagram of the structure illustrated in FIG. 7. In addition, referring to FIGS. 10 and 11, it can be observed that when frequency reduction is required, the diagram is divided into frame refresh and frame hold periods. Moreover, during the frame refresh period of FIG. 10, stages t1 to t3 are executed sequentially. During the frame refresh period of FIG. 11, stages t1 to t4 are executed sequentially.

Firstly, the operation principle of the structure illustrated in FIG. 6 will be described with reference to FIG. 10:

During stage t1, the potential of the light-emitting control signal provided by the second light-emitting control line EM2_N−7 is a low potential, and the potentials of the light-emitting control signal provided by the first light-emitting control line EM1, the gate drive signal provided by the gate line Gate1, and the light-emitting control signal provided by the second light-emitting control line EM2_N are all high potentials. Accordingly, the first reset transistor T6 is turned on, while the data writing transistor T2, the first light-emitting control transistor T3, the second light-emitting control transistor T4, the compensation transistor T5, and the third reset transistor T8 are all turned off. At this point, the first reset power signal provided by the first reset power line Vinit1 is transmitted to the control node N1 through the turned-on compensation transistor T5, thereby achieving the reset of the control node N1.

During stage t2, the potentials of the light-emitting control signal provided by the second light-emitting control line EM2_N−7 and the light-emitting control signal provided by the second light-emitting control line EM2_N are both low potentials, and the potentials of the light-emitting control signal provided by the first light-emitting control line EM1 and the gate drive signal provided by the gate line Gate1 are both high potentials. Accordingly, the first reset transistor T6 and the compensation transistor T5 are both turned on, while the data writing transistor T2, the first light-emitting control transistor T3, the second light-emitting control transistor T4, and the third reset transistor T8 are all turned off. In addition, based on the reset of the control node N1 during stage t1, the drive transistor T1 is turned on. At this point, the first reset power signal provided by the first reset power line Vinit1 is transmitted to the control node N1 through the turned-on compensation transistor T5, to the node N3 through the turned-on compensation transistor T5, and to the node N2 through the turned-on drive transistor T1, thereby achieving the reset of the node N2 and the node N3.

During stage t3, the potentials of the light-emitting control signal provided by the second light-emitting control line EM2_N and the gate drive signal provided by the gate line Gate1 are both low potentials, and the potential of the light-emitting control signal provided by the second light-emitting control line EM2_N−7 and the potential of the light-emitting control signal provided by the first light-emitting control line EM1 are both high potentials. Accordingly, the data writing transistor T2, the third reset transistor T8, and the compensation transistor T5 are all turned on, while the first reset transistor T6, the first light-emitting control transistor T3, and the second light-emitting control transistor T4 are all turned off. In addition, based on the reset of the control node N1 during stage t1, the drive transistor T1 is turned on. At this point, the data signal provided by data line Data is transmitted to the node N2 through the turned-on data writing transistor T2 and is also transmitted to the node N3 and the control node N1 through the turned-on drive transistor T1 and compensation transistor T5, thereby achieving the charging of the control node N1. Moreover, the third reset power signal provided by the third reset power line Vinit3 is transmitted to the node N4 through the turned-on third reset transistor T8, thereby achieving the reset of the node N4.

After stage t3, in the case that the potential of the light-emitting control signal provided by the first light-emitting control line EM1 transitions to a low potential, causing both the first light-emitting control transistor T3 and the second light-emitting control transistor T4 to turn on, a path is established between the drive power line VDD and the pull-down power line VSS, thereby driving the light-emitting element 022 to emit light.

Secondly, the operation principle of the structure illustrated in FIG. 7 will be described with reference to FIG. 11.

During stage t1, the potential of the first reset control signal provided by the first reset control line Reset1 is a low potential, and the potentials of the light-emitting control signal provided by the first light-emitting control line EM1, the light-emitting control signal provided by the second light-emitting control line EM2, and the gate drive signal provided by the gate line Gate1 are all high potentials. Accordingly, the first reset transistor T6 is turned on, while the data writing transistor T2, the first light-emitting control transistor T3, the second light-emitting control transistor T4, the compensation transistor T5, and the third reset transistor T8 are all turned off. At this point, the first reset power signal provided by the first reset power line Vinit1 is transmitted to the control node N1 through the turned-on compensation transistor T5, thereby achieving the reset of the control node N1.

During stage t2, the potentials of the first reset control signal provided by the first reset control line Reset1 and the gate drive signal provided by the gate line Gate1 transition between low and high potentials, and the potentials of both the light-emitting control signal provided by the first light-emitting control line EM1 and the light-emitting control signal provided by the second light-emitting control line EM2 remain high potentials. Accordingly, the first reset transistor T6 and the compensation transistor T5 are continuously turned on and turned off, while the data writing transistor T2, the first light-emitting control transistor T3, the second light-emitting control transistor T4, and the third reset transistor T8 all remain in the turned-off state. This allows for multiple times of refreshes and resets of the potential at the control node N1.

During stage t3, the potentials of the gate drive signal provided by the gate line Gate1 and the light-emitting control signal provided by the second light-emitting control line EM2 are both low potentials, and the potentials of the first reset control signal provided by the first reset control line Reset1 and the light-emitting control signal provided by the second light-emitting control line EM2 are both high potentials. Accordingly, the data writing transistor T2, the compensation transistor T5, and the third reset transistor T8 are all turned on, while the first light-emitting control transistor T3, the second light-emitting control transistor T4, and the first reset transistor T6 are all turned off. In addition, based on the reset of the control node N1 during stage t1, the drive transistor T1 is turned on. At this point, the data signal provided by data line Data is transmitted to the node N2 through the turned-on data writing transistor T2 and is also transmitted to the node N3 and the control node N1 through the turned-on drive transistor T1 and compensation transistor T5, thereby achieving the charging of the control node N1. Moreover, the third reset power signal provided by the third reset power line Vinit3 is transmitted to the node N4 through the turned-on third reset transistor T8, thereby achieving the reset of the node N4.

During stage t4, the potential of the light-emitting control signal provided by the second light-emitting control line EM2 is a low potential, and the potentials of the gate drive signal provided by the gate line Gate1, the first reset control signal provided by the first reset control line Reset1, and the light-emitting control signal provided by the second light-emitting control line EM2 are all high potentials. Accordingly, the data writing transistor T2 and the third reset transistor T8 are both turned on, while the first light-emitting control transistor T3, the second light-emitting control transistor T4, the compensation transistor T5, and the first reset transistor T6 are all turned off. At this point, the data signal provided by data line Data continues to be transmitted to the node N2 through the turned-on data writing transistor T2 to refresh the potential at the node N2. Moreover, the third reset power signal provided by the third reset power line Vinit3 is transmitted to the node N4 through the turned-on third reset transistor T8, thereby achieving the reset of the node N4.

After stage t4, in the case that the potential of the light-emitting control signal provided by the first light-emitting control line EM1 transitions to a low potential, causing both the first light-emitting control transistor T3 and the second light-emitting control transistor T4 to turn on, a path is established between the drive power line VDD and the pull-down power line VSS, thereby driving the light-emitting element 022 to emit light.

In addition, with reference to FIGS. 10 and 11, it can also be observed that in both the structures illustrated in FIGS. 6 and 7 during the frame hold period, the potentials of both the first reset control signal provided by the first reset control line Reset1 and the gate drive signal provided by the gate line Gate1 remain high potentials, while the potential of the light-emitting control signal provided by the first light-emitting control line EM1 first remains a high potential, then after a period of time transitions to a low potential. In addition, during the period when the potential of the light-emitting control signal provided by the first light-emitting control line EM1 is a high potential, the potential of the light-emitting control signal provided by the second light-emitting control line EM2 remains a low potential for a certain duration (e.g., as illustrated in the figure during stage t5), and during the time outside stage t5, the potential of the light-emitting control signal provided by the second light-emitting control line EM2 remains a high potential.

During stage t5, the data writing transistor T2 and the third reset transistor T8 are both turned on, while the rest of the transistors are all turned off. At this point, the data signal provided by data line Data is transmitted to the node N2 through the turned-on data writing transistor T2, and the third reset power signal provided by the third reset power line Vinit3 is transmitted to the node N4 through the turned-on third reset transistor T8, achieving the refresh and reset for the node N2 and the node N4. In the case that the potential of the light-emitting control signal provided by the first light-emitting control line EM1 transitions to a low potential, causing the establishment of a path between the drive power line VDD and the pull-down power line VSS, the light-emitting element 022 continues emitting light within the frame hold period.

Moreover, referring to FIGS. 10 and 11, it can also be observed that during the frame refresh period of the display panel, the initial power line Vinit0 is configured to provide an initial power signal of a first potential (i.e., a low potential). In addition, during the frame hold period of the display panel, the initial power line Vinit0 is configured to provide an initial power signal of a second potential (i.e., a high potential). That is, during the frame hold period, the potential of the initial power signal is altered, achieving the purpose of stabilizing the potential of the control node N1 and reducing the current leakage of the drive transistor T1.

Figure 12:
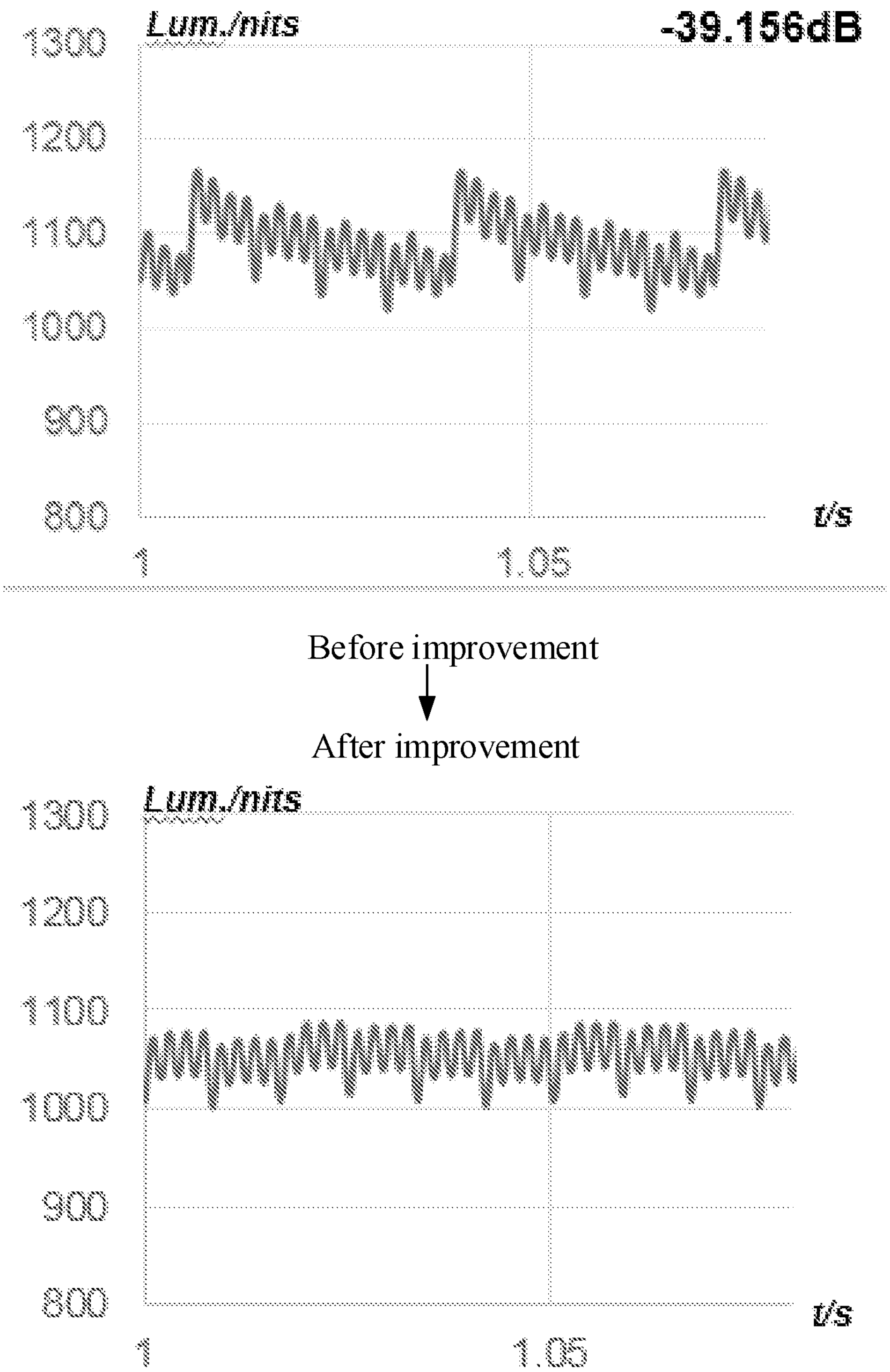
FIG. 12 illustrates the displaying brightness curve of a display panel before and after improvements according to some embodiments of the present disclosure.

In some embodiments, FIG. 12 illustrates the displaying brightness waveform of the display panel within a frame without and with the addition of the regulation capacitor C1 (i.e., before and after improvement). The x-axis represents time in seconds(s), and the y-axis represents brightness in lumens per nit (Lum/nits).

Comparing the brightness waveform before and after improvement in FIG. 12, it can be observed that after the addition of the regulation capacitor C1 as described in the aforementioned embodiments, the displaying brightness curve of the LTPS product within a frame, especially during low-frequency displays, is significantly improved, leading to an increase in the brightness retention rate. Consequently, it alleviates screen flickering, rendering it imperceptible to the human eye, and thus ensures a better display performance on the display panel.

In summary, a display panel is provided according to the embodiments disclosed herein. The pixel circuit in the display panel includes a control circuit, a drive circuit, and a regulating circuit. The control circuit controls the potential of the coupled control node based on the gate drive signal provided by the gate line and the data signal provided by the data line. The drive circuit drives the light-emitting element to emit light based on the potential of the control node and the drive power signal provided by the drive power line. The regulating circuit adjusts the potential of the control node through the coupling effect based on the drive power signal and the initial power signal provided by the initial power line. The flexible adjustment of the initial power signal enhances the stability of the potential at the control node, and reduces the current leakage of the drive transistor within the drive circuit, thereby alleviating screen flickering in the display panel, and ensuring a better display performance of the display panel.

Figure 13:
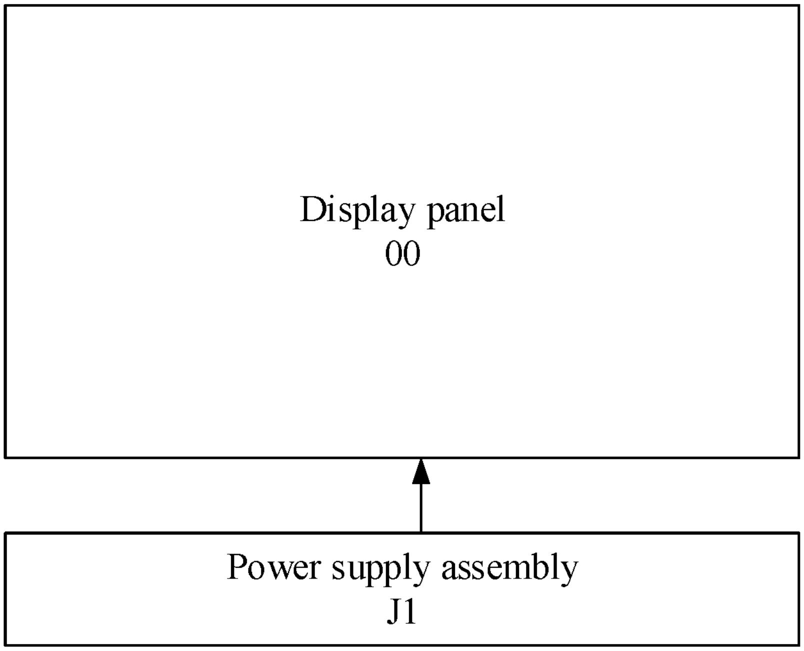
FIG. 13 is a schematic structural diagram of a display device according to some embodiments of the present disclosure.

FIG. 13 is a schematic structural diagram of a display device according to some embodiments of the present disclosure. As illustrated in FIG. 13, the display device includes a power supply assembly J1 and the display panel 00 as described in the aforementioned embodiments.

The power supply assembly J1 is coupled to the display panel 00 and is configured to supply power to the display panel 00.

In some embodiments, the display device is any product or component with display functionality such as an OLED device, a mobile phone, a tablet, a television, or a monitor.

It should be noted that in the accompanying drawings, the sizes of the layers and regions may be exaggerated for clarity of illustration. Also, it should be understood that in the case that an element or layer is referred to as being "on" another element or layer, it may be directly on the other element, or an intermediate layer may be present. In addition, it should be understood that in the case that an element or layer is referred to as being "under" another element or layer, it may be directly under the other element, or one or more intermediate layers or elements may be present. In addition, it should also be understood that in the case that a layer or element is referred to as being "between" two layers or elements, it may be the only layer between the two layers or elements, or one or more intermediate layers or elements may also be present. Like reference numerals refer to like elements throughout the present disclosure.

Moreover, terms used in detailed description of the present disclosure are defined to merely explain the embodiments of the present disclosure and are not intended to limit the present disclosure. Unless otherwise defined, technical or scientific terms used in detailed description of the present disclosure should have the ordinary meanings as understood by those of ordinary skill in the art to which the present disclosure belongs.

For example, in the embodiments disclosed herein, the terms "first" and "second" are used solely for descriptive purposes and should not be construed as indicating or implying relative importance. The term "a plurality of" refers to two or more, unless otherwise explicitly defined.

Likewise, "a", "an" or similar words do not denote a quantity limitation, but indicate the presence of at least one.

"Include", "comprise" or similar words imply that the elements or items preceding the word "include" or "comprise" cover the elements or items listed after the word "include" or "comprise" as well as their equivalents, without excluding other elements or items.

"Up", "down", "left", "right" or the like is only defined to indicate relative position relationship. In the case that the absolute position of the described object is changed, the relative position relationship may be changed accordingly. "Connected" or "coupled" refers to an electrical connection.

"And/or" indicates that three relationships may be present. For example, A and/or B may indicate that only A is present, both A and B are present, and only B is present. The symbol "/" generally indicates an "or" relationship between the associated objects.

Described above are merely optional embodiments of the present disclosure and are not intended to limit the present disclosure. Any modifications, equivalents, improvements, and the like, made within the spirit and principle of the present disclosure, should be included in the protection scope of the present disclosure.

What is claimed is:

1. A display panel, comprising: a substrate and a plurality of pixels disposed on the substrate, wherein each pixel comprises a pixel circuit and a light-emitting element, wherein the pixel circuit is coupled to the light-emitting element and configured to drive the light-emitting element to emit light, and the pixel circuit comprises: a control circuit coupled respectively to a gate line, a data line, and a control node and configured to control a potential of the control node based on a gate drive signal provided by the gate line and a data signal provided by the data line; a drive circuit with a control terminal coupled to the control node, an input terminal coupled to a drive power line, and an output terminal coupled to the light-emitting element and configured to transmit a drive signal to the light-emitting element based on the potential of the control node and a drive power signal provided by the drive power line to drive the light-emitting element to emit light; a regulating circuit coupled respectively to the drive power line, the control node, and an initial power line and configured, through a coupling effect, to regulate the potential of the control node based on an initial power signal provided by the initial power line and the drive power signal; and wherein the drive circuit comprises a drive transistor, and the regulating circuit comprises at least one regulation capacitor and a storage capacitor, wherein a gate of the drive transistor is coupled to the control node, a first electrode of the drive transistor is coupled to the drive power line, and a second electrode of the drive transistor is coupled to the light-emitting element; the at least one regulation capacitor is connected in series between the drive power line and the control node, and the at least one regulation capacitor is also coupled to the initial power line; and the storage capacitor is connected in series between the drive power line and the control node.

2. The display panel according to claim 1, further comprising: a semiconductor layer, a first metal layer, and a second metal layer sequentially laminated on a side, distal to the substrate, of the substrate, wherein the semiconductor layer is configured to form a first active layer of the at least one regulation capacitor and a second active layer of the drive transistor; the first metal layer and the second metal layer are respectively configured to form a first capacitor plate and a second capacitor plate of the storage capacitor, the first capacitor plate is coupled to the control node, and the second capacitor plate is coupled to the drive power line, wherein both orthographic projections of the first active layer onto the substrate and the second active layer onto the substrate are overlapped with an orthographic projection of the second capacitor plate onto the substrate.

3. The display panel according to claim 2, wherein the regulating circuit comprises two regulation capacitors, wherein an overlapping portion between the first active layer and the second capacitor plate is configured to form one regulation capacitor connected in series between the drive power line and the initial power line, and an adjacent portion of the first active layer and the first capacitor plate is configured to form another regulation capacitor connected in series between the initial power line and the control node.

4. The display panel according to claim 2, wherein the first active layer comprises a first active portion and a second active portion connected in a first direction, wherein an orthographic projection of the second active portion onto the substrate is overlapped with the orthographic projection of the second capacitor plate onto the substrate, and an orthographic projection of the first active portion onto the substrate is not overlapped with the orthographic projection of the second capacitor plate onto the substrate;

the display panel further comprises an insulating layer and a third metal layer that are disposed on a side, distal to the substrate, of the second metal layer, wherein the third metal layer is configured to form a metal portion coupled to the initial power line;

and the metal portion is overlapped with the first active portion through a via hole penetrating the insulating layer, allowing the initial power line to be coupled to the at least one regulation capacitor.

5. The display panel according to claim 4, wherein an area of the orthographic projection of the first active portion onto the substrate is smaller than an area of the orthographic projection of the second active portion onto the substrate.

6. The display panel according to claim 4, wherein the metal portion comprises a first metal segment extending along the first direction.

7. The display panel according to claim 4, wherein the metal portion comprises a second metal segment extending along a second direction, wherein the second direction intersects with the first direction.

8. The display panel according to claim 7, wherein in the first direction, the first active layer and the second active layer are arranged in a staggered manner, and in the second direction, the first active layer and the second active layer are arranged at intervals;

the plurality of pixels are arranged in an array, wherein the first direction represents a pixel row direction, the second direction represents a pixel column direction, and the first direction is perpendicular to the second direction.

9. The display panel according to claim 1, wherein the control circuit comprises:

a data writing module coupled respectively to the gate line, the data line, and the input terminal of the drive circuit and configured to control connection and disconnection between the data line and the input terminal of the drive circuit based on the gate drive signal;

a light-emitting control module coupled respectively to a light-emitting control line, the drive power line, the input terminal of the drive circuit, the output terminal of the drive circuit, and the light-emitting element and configured to control connection and disconnection between the drive power line and the input terminal of the drive circuit and to control connection and disconnection between the output terminal of the drive circuit and the light-emitting element based on a light-emitting control signal provided by the light-emitting control line;

a compensation module coupled respectively to a compensation control line, the output terminal of the drive circuit, and the control node and configured to control connection and disconnection between the output terminal of the drive circuit and the control node based on a compensation control signal provided by the compensation control line; and a first reset module coupled respectively to a first reset control line, a first reset power line, and the control node and configured to control connection and disconnection between the first reset power line and the control node based on a first reset control signal provided by the first reset control line.

10. The display panel according to claim 9, wherein the compensation control line and the gate line are independent of each other; within a refresh cycle, a period for the compensation control line providing a compensation control signal of an active potential is overlapped with a period for the first reset control line providing a first reset control signal of an active potential, and a number of times that the compensation control line provides the compensation control signal of the active potential and a number of times that the first reset control line provides the first reset control signal of the active potential are both greater than or equal to 3, wherein the compensation control signal of the active potential is configured to enable the connection between the output terminal of the drive circuit and the control node, and the first reset control signal of the active potential is configured to enable the connection between the first reset power line and the control node.

11. The display panel according to claim 10, wherein the light-emitting control line comprises a first light-emitting control line and a second light-emitting control line, wherein the light-emitting control module is coupled to the first light-emitting control line;

the compensation control line and the first reset control line are both shared with the second light-emitting control line; the compensation control line is shared with an N-th second light-emitting control line, and the first reset control line is shared with an N-7-th second light-emitting control line, where N is an integer greater than 7;

a period for the N-7-th second light-emitting control line providing a signal of an active potential is overlapped with a period for the N-th second light-emitting control line providing a signal of an active potential, and the period for the N-th second light-emitting control line providing the signal of the active potential is overlapped with the period for the gate line providing a gate drive signal of an active potential, wherein the gate drive signal of the active potential is configured to enable the connection between the data line and the input terminal of the drive circuit.

12. The display panel according to claim 9, wherein the compensation control line is shared with the gate line; the control circuit further comprises:

a second reset module coupled respectively to a second reset control line, a second reset power line, and the input terminal of the drive circuit and configured to control connection and disconnection between the second reset power line and the input terminal of the drive circuit based on a second reset control signal provided by the second reset control line.

13. The display panel according to claim 1, wherein during a frame refresh period of the display panel, the initial power line is configured to provide an initial power signal of a first potential, and during a frame hold period of the display panel, the initial power line is configured to provide an initial power signal of a second potential, wherein the first potential is different from the second potential.

14. A display panel, comprising a power supply assembly and a display wherein the power supply assembly is coupled to the display panel and is configured to supply power to the display panel; and the display panel comprises: a substrate and a plurality of pixels disposed on the substrate, wherein each pixel comprises a pixel circuit and a light-emitting element, wherein the pixel circuit is coupled to the light-emitting element and configured to drive the light-emitting element to emit light, and the pixel circuit comprises: a control circuit coupled respectively to a gate line, a data line, and a control node and configured to control a potential of the control node based on a gate drive signal provided by the gate line and a data signal provided by the data line; a drive circuit with a control terminal coupled to the control node, an input terminal coupled to a drive power line, and an output terminal coupled to the light-emitting element and configured to transmit a drive signal to the light-emitting element based on the potential of the control node and a drive power signal provided by the drive power line to drive the light-emitting element to emit light; and a regulating circuit coupled respectively to the drive power line, the control node, and an initial power line and configured, through a coupling effect, to regulate the potential of the control node based on an initial power signal provided by the initial power line and the drive power signal; and wherein the drive circuit comprises a drive transistor, and the regulating circuit comprises at least one regulation capacitor and a storage capacitor, wherein a gate of the drive transistor is coupled to the control node, a first electrode of the drive transistor is coupled to the drive power line, and a second electrode of the drive transistor is coupled to the light-emitting element; the at least one regulation capacitor is connected in series between the drive power line and the control node, and the at least one regulation capacitor is also coupled to the initial power line; and the storage capacitor is connected in series between the drive power line and the control node.

15. The display panel according claim 14, wherein the display panel further comprises: a semiconductor layer, a first metal layer, and a second metal layer sequentially laminated on a side, distal to the substrate, of the substrate, wherein the semiconductor layer is configured to form a first active layer of the at least one regulation capacitor and a second active layer of the drive transistor; the first metal layer and the second metal layer are respectively configured to form a first capacitor plate and a second capacitor plate of the storage capacitor, the first capacitor plate is coupled to the control node, and the second capacitor plate is coupled to the drive power line, wherein both orthographic projections of the first active layer onto the substrate and the second active layer onto the substrate are overlapped with an orthographic projection of the second capacitor plate onto the substrate.

16. The display device according to claim 15, wherein the regulating circuit comprises two regulation capacitors, wherein an overlapping portion between the first active layer and the second capacitor plate is configured to form one regulation capacitor connected in series between the drive power line and the initial power line, and an adjacent portion of the first active layer and the first capacitor plate is configured to form another regulation capacitor connected in series between the initial power line and the control node.

17. The display device according to claim 15, wherein the first active layer comprises a first active portion and a second active portion connected in a first direction, wherein an orthographic projection of the second active portion onto the substrate is overlapped with the orthographic projection of the second capacitor plate onto the substrate, and an orthographic projection of the first active portion onto the substrate is not overlapped with the orthographic projection of the second capacitor plate onto the substrate;

the display panel further comprises an insulating layer and a third metal layer that are disposed on a side, distal to the substrate, of the second metal layer, wherein the third metal layer is configured to form a metal portion coupled to the initial power line;

and the metal portion is overlapped with the first active portion through a via hole penetrating the insulating layer, allowing the initial power line to be coupled to the at least one regulation capacitor.

18. The display device according to claim 14, wherein the control circuit comprises:

a data writing module coupled respectively to the gate line, the data line, and the input terminal of the drive circuit and configured to control connection and disconnection between the data line and the input terminal of the drive circuit based on the gate drive signal;

a light-emitting control module coupled respectively to a light-emitting control line, the drive power line, the input terminal of the drive circuit, the output terminal of the drive circuit, and the light-emitting element and configured to control connection and disconnection between the drive power line and the input terminal of the drive circuit and to control connection and disconnection between the output terminal of the drive circuit and the light-emitting element based on a light-emitting control signal provided by the light-emitting control line;

a compensation module coupled respectively to a compensation control line, the output terminal of the drive circuit, and the control node and configured to control connection and disconnection between the output terminal of the drive circuit and the control node based on a compensation control signal provided by the compensation control line; and a first reset module coupled respectively to a first reset control line, a first reset power line, and the control node and configured to control connection and disconnection between the first reset power line and the control node based on a first reset control signal provided by the first reset control line.

* * * * *